F. M. BONTA.
FRUIT CLIPPER.
APPLICATION FILED OCT. 20, 1910.
987,095.
Patented Mar. 14, 1911.
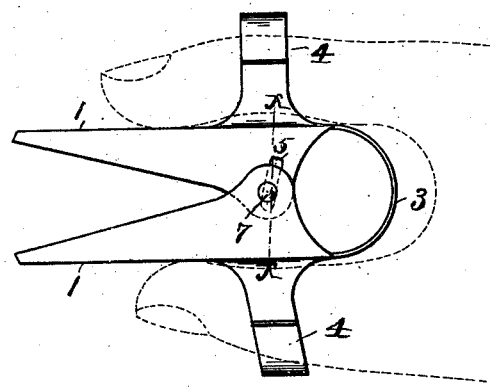
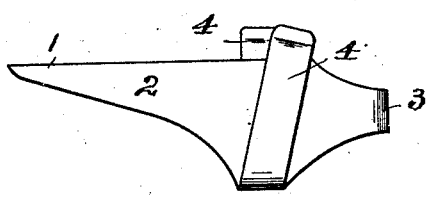 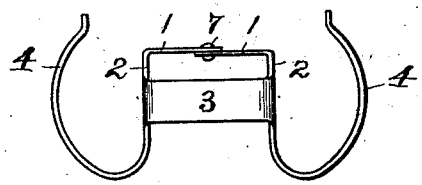
WITNESSES:
Chas. W. Kirschenbaum
S. Kaiser
INVENTOR.
Frank M. Bonta
BY John J. Laass
ATTORNEY.
THE NORRIS PETERS CO., WASHINGTON, D. C.

UNITED STATES PATENT OFFICE.

FRANK M. BONTA, OF SYRACUSE, NEW YORK, ASSIGNOR TO THE CLIPPER NOVELTY COMPANY, OF SYRACUSE, NEW YORK, A CORPORATION OF NEW YORK.

FRUIT-CLIPPER.

987,095.  Specification of Letters Patent.  Patented Mar. 14, 1911.

Application filed October 20, 1910. Serial No. 588,066.

*To all whom it may concern:*

Be it known that I, FRANK M. BONTA, a citizen of the United States, and resident of Syracuse, in the county of Onondaga, in the State of New York, have invented new and useful Improvements in Fruit-Clippers, of which the following, taken in connection with the accompanying drawings, is a full, clear, and exact description.
This invention relates to the class of implements which are designed to be held in the hand for severing the stems of fruit, etc., in the operation of picking the same.

The object of the invention is to produce a simple and inexpensive implement which can be conveniently held between the forefinger and thumb whereby the remaining fingers will be free to grasp the fruit as the stems are cut.
To that end the invention consists in the novel construction of the improved fruit-clipper hereinafter described and claimed.

In the accompanying drawings Figure 1 is a plan view of the fruit-clipper embodying my invention, the manner of holding same being illustrated by dotted lines; Fig. 2 is a side view of the same; Fig. 3 is a rear end view; and Fig. 4 is a transverse section on the line —X—X—.
The said clipper is struck up from a single piece of sheet steel and comprises a pair of blades —1—1— which are correspondingly tapered toward their forward ends and have their inner edges ground in the well known manner so as to produce a shearing cut.

Along the outer edges of the blades are formed flanges —2—2— which extend beyond the rear ends of said blades and are connected by a curved connecting strip —3—
constituting a spring tensioned to hold the blades normally in open position. These flanges or reinforcing strips 2, 2 terminate a short distance from the forward ends of the blades and they are gradually increased in depth toward the rear to afford a firm grasp for the hand, and on the lower edges of said flanges are formed outwardly and upwardly extending open loops or finger clips —4—4— which project above the blades and projecting in a plane substantially at right angles to the cutting plane of the blades and are designed to receive the thumb and forefinger respectively as represented in Fig. 1 of the drawings.

The rear end portion of one of the blades is provided with a transversely disposed slot —5— which is slightly curved and the corresponding end portion of the other blade is provided with a coinciding eye —6—, and through said slot and eye passes a rivet —7—, whereby the blades are retained in proper relation.

It will be understood that the described implement may be used in picking vegetables of various kinds, in which instances it is held in inverted position.

What I claim is:—

1. A pair of shears formed from a single piece of sheet metal bent to form coöperating blades having cutting edges and movable bodily one on the other, the edges of the blades opposite the cutting edges being bent upwardly to form reinforcing strips against which manual pressure may be exerted, and being continued horizontally to form a curved connecting strip tensioned to hold said blades separated, said reinforcing strips being also bent to form finger clips located between the ends of the blades and the connecting strip, and in a plane substantially at right angles to the cutting plane of said blades, and means for limiting the separating movement of said blades.

2. A pair of shears having coöperating blades movable one on the other, reinforcing strips on the edge of said blades opposite the cutting edge and extending at right angles thereto, a tensioned curved connecting strip extending between the inner ends of said reinforcing strips, and finger clips located between the ends of the blades and the tensioned strip and projecting at right angles to the reinforcing strips.

FRANK M. BONTA.

Witnesses:
S. R. LOWRIE,
G. KAISER.

Copies of this patent may be obtained for five cents each, by addressing the "Commissioner of Patents, Washington, D. C."